(12) United States Patent
Shieh (10) Patent No.: US 6,859,754 B2
(45) Date of Patent: Feb. 22, 2005

(54) STATISTICAL PROCESS CONTROL METHOD AND SYSTEM THEREOF

(75) Inventor: Ming-Yuan Shieh, Hsinchu (TW)

(73) Assignee: Mosel Vitelic, Inc., Hsinchu (TW)

(*) Notice: Subject to any disclaimer, the term of this patent is extended or adjusted under 35 U.S.C. 154(b) by 0 days.

(21) Appl. No.: 10/382,548

(22) Filed: Mar. 5, 2003

(65) Prior Publication Data

US 2003/0216887 A1 Nov. 20, 2003

(30) Foreign Application Priority Data

May 16, 2002 (CN) .......................................... 091110300

(51) Int. Cl.⁷ .............................................. G06F 17/00
(52) U.S. Cl. ........................................ 702/179; 700/59
(58) Field of Search .............................. 700/28–30, 33, 700/34, 51–55, 67; 702/179, 181

(56) References Cited

U.S. PATENT DOCUMENTS

| | | | |
|---|---|---|---|
| 5,526,293 A |   | 6/1996 | Mozumder et al. |
| 5,841,676 A | * | 11/1998 | Ali et al. .................... 702/84 |
| 5,862,054 A |   | 1/1999 | Li |
| 5,987,398 A | * | 11/1999 | Halverson et al. .......... 702/179 |
| 6,216,048 B1 | * | 4/2001 | Keeler et al. ................ 700/44 |
| 6,408,220 B1 | * | 6/2002 | Nulman ....................... 700/121 |
| 6,549,864 B1 | * | 4/2003 | Potyrailo ..................... 702/81 |
| 6,731,990 B1 | * | 5/2004 | Carter et al. ................. 700/52 |
| 6,756,243 B2 | * | 6/2004 | Pasadyn et al. .............. 438/14 |

OTHER PUBLICATIONS

Borror et al., Editorial, Statistical Experimental Design: Some Recent Advances and Applications, 2000, Quality and Reliability Engineering International.*

Loredo et al., model–Based Control Chart for Autoregressive and Correlated Data, Aug. 27, 2002, Quality and Reliability Engineering International.*

Heredia–Langner et al., Performance of Customized Control Charts to Detect Process Disturbances, Quality and Reliability Engineering International.*

Mandel, B.J., "The Regression Control Chart," *Journal of Quality Technology*, 1(1):1–9 (1969).

* cited by examiner

*Primary Examiner*—Marc S. Hoff
*Assistant Examiner*—Craig Steven Miller
(74) *Attorney, Agent, or Firm*—Townsend and Townsend and Crew LLP (57) ABSTRACT

A statistical process control (SPC) method, wherein a post-stage process corresponds to a pre-stage process, is disclosed in the present invention. In one embodiment, the SPC method comprises: collecting a plurality of pre-stage measurements and post-stage measurements respectively during the pre-stage process and the post-stage process; evaluating an equation for approaching a relation between the plurality of post-stage measurements and the plurality of pre-stage measurements; calculating based on the equation a post-stage variance being independent of the fluctuation of the plurality of pre-stage measurements; and monitoring the post-stage process of mass production by an upper and a lower control limits, wherein the upper control limit is equal to the equation plus half order of the post-stage variance and the lower control limit is equal to the equation minus half order of the post-stage variance.

20 Claims, 8 Drawing Sheets

FIG. 8

STATISTICAL PROCESS CONTROL METHOD AND SYSTEM THEREOF

CROSS-REFERENCES TO RELATED APPLICATIONS

This application claims priority from R.O.C. Patent Application No. 091110300, filed May 16, 2002, the entire disclosure of which is incorporated herein by reference.

BACKGROUND OF THE INVENTION

The invention relates in general to a statistical process control (SPC) method applicable in situations where the post-stage process is related to the pre-stage process, and more particularly to a SPC method capable of separating the influence of the variation of the pre-stage process from that of the post-stage process.

The method of statistical process control (SPC) has been applied for improving the product quality in many manufacturing processes after Dr. W. A. Shewhart drew the first SPC chart in 1924 and published the article "Economic Control of Quality of Manufactured Products" in 1931. The SPC method involves using statistical techniques to measure and analyze the variation in the processes and aims to keep the processes under control. No matter how good or bad the design, SPC can ensure that the product is being manufactured as designed and intended. Thus, SPC will not improve the reliability of a poorly designed product, but it can be used to maintain the consistency of how the product is made, and therefore, of the manufactured product itself and its reliability as designed.

The measured data in the SPC chart usually varies within a certain range by some reasons, which are classified as either permissible factor (within the control) or excessive factor (out of the control). While the products are processed only with some permissible factors, the manufacturing will be stable and the variation of the product quality character will be within a predictable and controllable range. If the products are processed with some permissible factors and some excessive factors, the manufacturing will be unstable and the variation of the product character will be out of a statistical control range. Therefore, the inline SPC system can detect the occurrence of excessive factor and improve the product manufacturing quality thereby.

Figure 1:
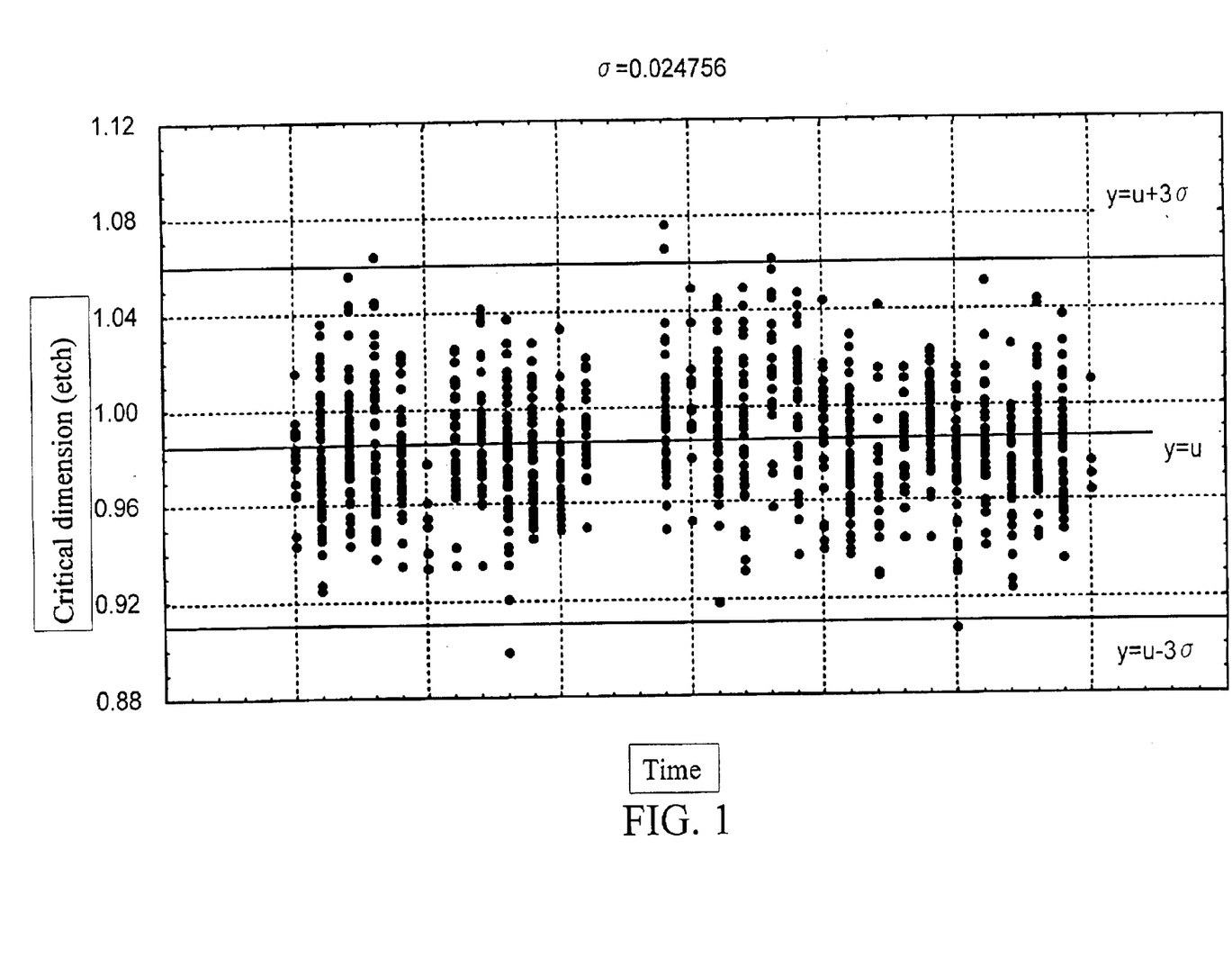
FIG. 1 shows an SPC scatter plot for monitoring the semiconductor manufacturing according to a traditional method.

Referring to FIG. 1, it shows a SPC scatter plot for monitoring semiconductor manufacturing according to a traditional method, wherein the vertical axis represents the critical-dimension measurement after etching and the horizontal axis represents the time. The average of the critical-dimension measurements is represented by solid line of y=u, and the upper and lower control limits are represented by the dashed lines of y=u+3σ and y=u−3σ, respectively, where σ is the standard deviation of the measurements.

There are 1030 times of sampling measurements in FIG. 1, which are measured and collected under a stable photolithography process followed by a stable etching process. However, the SPC method delivers a warning message because of 6 measurements found to be out of the control limits, wherein the 6 measurements exceed by 3 measurements under the same sampling number, being expected to be out of the control limits with 99.73% possibility by three sigma (3σ) standard deviation. This is because a dependent relation exists between the photolithography process and the etching process, and the variation of the critical dimension measurements for the etching process is affected by that in the photolithography process.

Figure 2:
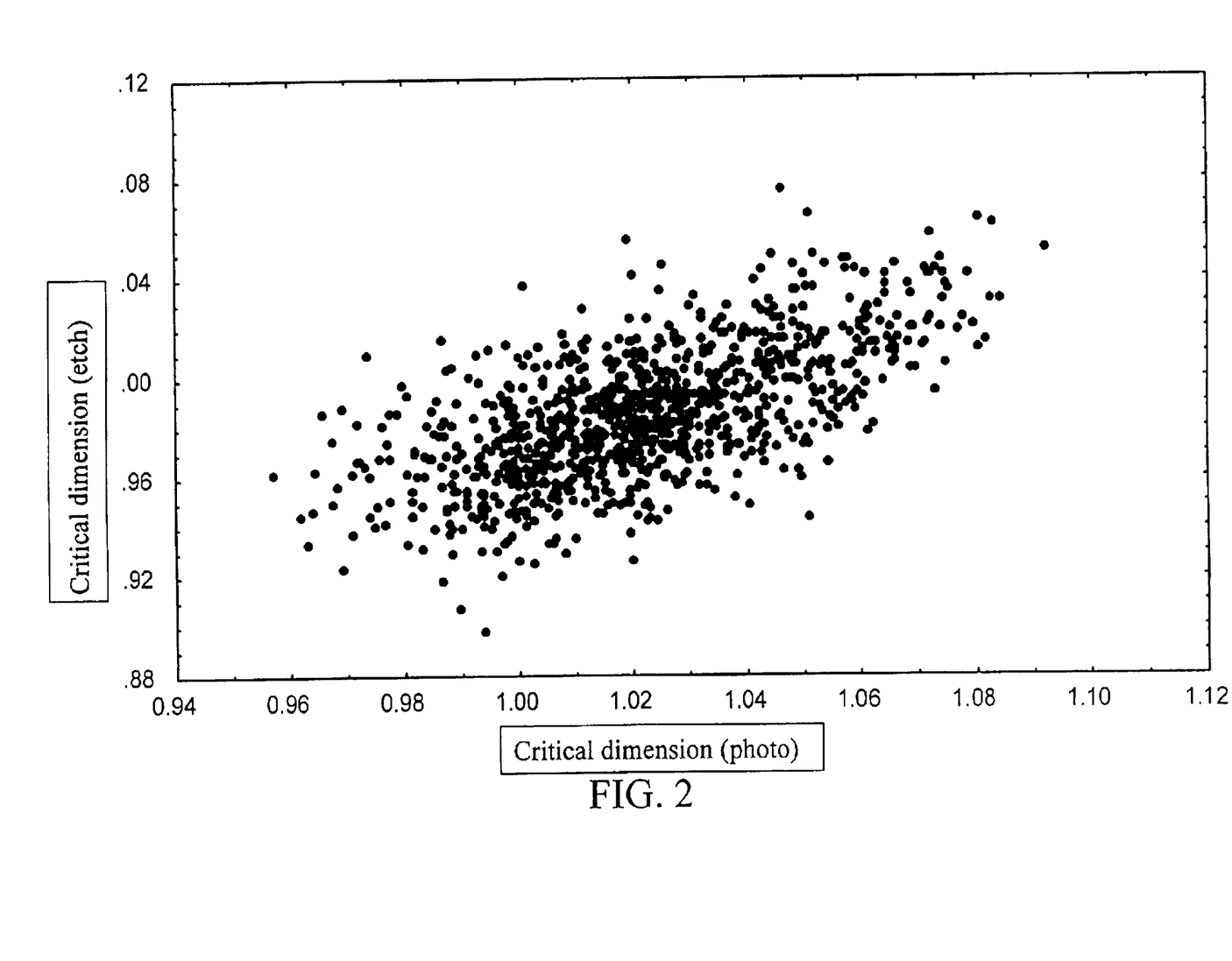
FIG. 2 shows the dependent relation between the photolithography process and the etching process according to the traditional method.

FIG. 2 shows the dependent relation between the photolithography process and the etching process, wherein the vertical axis represents the etching critical dimension measurements and the horizontal axis represents the photolithography critical dimension measurements. Under such existing distributional relation between the post-stage and the pre-stage, the traditional SPC system is no longer able to provide the correct information and accordingly loses its monitoring function.

Against the traditional method, the SPC method with non-constant mean is disclosed in U.S. Pat. No. 5,987,398, wherein the average of the film thickness, y=u, is modified to a decreasing value. The method is especially applicable in the sputtering process, wherein the metal target decreases in the continuing process and the thickness of the deposited metal film becomes thinner during a certain period of time. However, the SPC method with non-constant mean cannot solve the problem that the variation of the pre-stage process affects that of the post-stage process.

BRIEF SUMMARY OF THE INVENTION

Embodiments of the invention provide a SPC method for separating the variance contributed by the post-stage process from that of the pre-stage process.

First, the pre-stage measurements and the post-stage measurements are collected under a stable pre-stage process and a stable post-stage process, respectively. Then, a mathematical equation, approaching the relation between the pre-stage measurements and post-stage measurements, is derived by a regression method. Next, the post-stage variance, independent of the fluctuations of the post-stage measurements, is calculated by the ANOVA method. Finally, an upper and a lower control limits, respectively the mathematical equations plus and minus a half order of the variance, are applied to the mass production of the post-stage process.

One aspect of the present invention is directed to a statistical process control (SPC) method for a post-stage process which is related to a pre-stage process. The SPC method comprises collecting a plurality of pre-stage measurements during the pre-stage process; collecting a plurality of post-stage measurements during the post-stage process, wherein the plurality of post-stage measurements correspond to the plurality of pre-stage measurements; evaluating an equation for approaching a relation between the plurality of post-stage measurements and the plurality of pre-stage measurements; calculating a post-stage variance based on the equation, wherein the post-stage variance is independent of a fluctuation of the plurality of pre-stage measurements; and monitoring the post-stage process of mass production by an upper control limit and a lower control limit. The upper control limit is equal to the equation plus half order of the post-stage variance and the lower control limit is equal to the equation minus half order of the post-stage variance.

Another aspect of the present invention is directed to a statistical process control (SPC) system for a post-stage process which is related to a pre-stage process, wherein a plurality of pre-stage measurements and a plurality of post-stage measurements are collected respectively under a stable pre-stage process and a post-stage process and are corresponding to each other. The SPC system comprises a fitting module configured to evaluate an equation to approach the relation formed by the plurality of post-stage measurements and the plurality of pre-stage measurements. A filtering module is configured to calculate a post-stage variance based on the equation. The post-stage variance is independent of a fluctuation of the plurality of pre-stage measurements. A monitoring module is configured to monitor the post-stage process on mass production by an upper control limit and a lower control limit. The upper control limit is equal to the equation plus half order of the post-stage variance and the lower control limit is equal to the equation minus half order of the post-stage variance.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention provides a statistical process control (SPC) method, which is particularly applicable in the situation where the post-stage process is related to the pre-stage process. The following embodiment is described using the example of a photolithography process and an etching process as the pre-stage process and the post-stage process, respectively. However, the scope of the present invention is not limited thereto.

Figure 3:
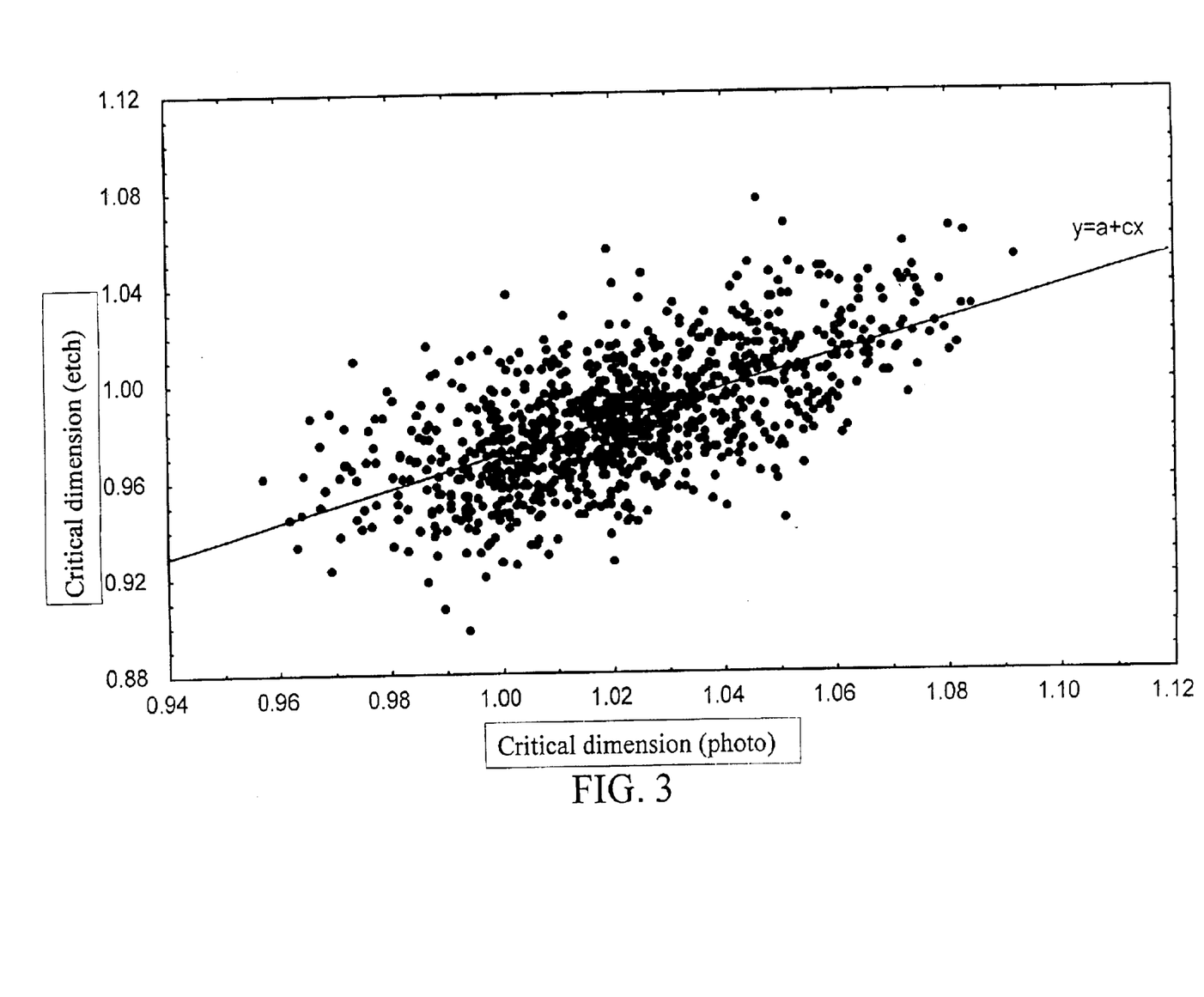
FIG. 3 shows a regression line evaluated according to the critical dimension measurements distribution of FIG. 2 employing a method according to an embodiment of the present invention.

Referring to FIG. 3, it shows a regression line evaluated according to the critical dimension measurements distribution of FIG. 2, wherein the photolithography critical dimension measurement $X_i$ and the etch critical dimension $Y_i$ are both data collected under stable processes. The distribution relation of the photolithography critical dimension $X_i$ and etch critical dimension $Y_i$ is approached by the relation of y=a+cx, wherein the constants a and c satisfy the minimum result of the equation $$\sum_{i=1}^{n}(Y_i - (a + cX_i))^2.$$

If c is not zero, there will be a dependent property between the photolithography critical dimension $X_i$ and the etch critical dimension $Y_i$. The fluctuation of the etch critical dimension $Y_i$ becomes larger as the distribution of the photolithography critical dimension $X_i$ extends over a larger range. Accordingly, part of the variance for the etch critical dimension $Y_i$ is contributed from that of the photolithography critical dimension $X_i$. Therefore, the upper control limit (UCL) and lower control limit (LCL), which are determined only by the distribution of the etch critical dimension $Y_i$, are too loose or non-rigorous to detect the unstable process. Also, for the case that data of the etch critical dimension $Y_i$ is out of the upper or lower control limits, it is difficult to determine if the problem results from the etch process itself or is inherited from the photolithography process. To solve the problems described above, it becomes desirous to separate the variance of the photolithography critical dimension $X_i$ from that of the etch critical dimension $Y_i$.

In the present invention, the separation of the variance is achieved by applying the method of the ANOVA (analysis of variance). Firstly, the â and ĉ, being the estimated values of a and c, are defined by the following equations:

$$\hat{c} = \frac{\sum (X_i - \overline{X})(Y_i - \overline{Y})}{\sum (X_i - \overline{X})^2}, \ \hat{a} = \overline{Y} - \hat{c}\overline{X}$$

where $\hat{Y}_i = \hat{a} + \hat{c}X_i$.

The $\overline{X}$ and $\overline{Y}$ are the averages of the $X_i$ and $Y_i$ respectively, and $\hat{Y}_i$, is the estimation of the measurement Y as X is equal to $X_i$. The residual $e_i$ of ith measurement is the estimation of the error ($\epsilon_i$) between the ith measurement (Yi) and the estimation of the measurement Y as X equals to $X_i$. The residual $e_i$ can be represented by the following equation:

$$e_i = Y_i - \hat{Y}_i.$$

Figure 4:
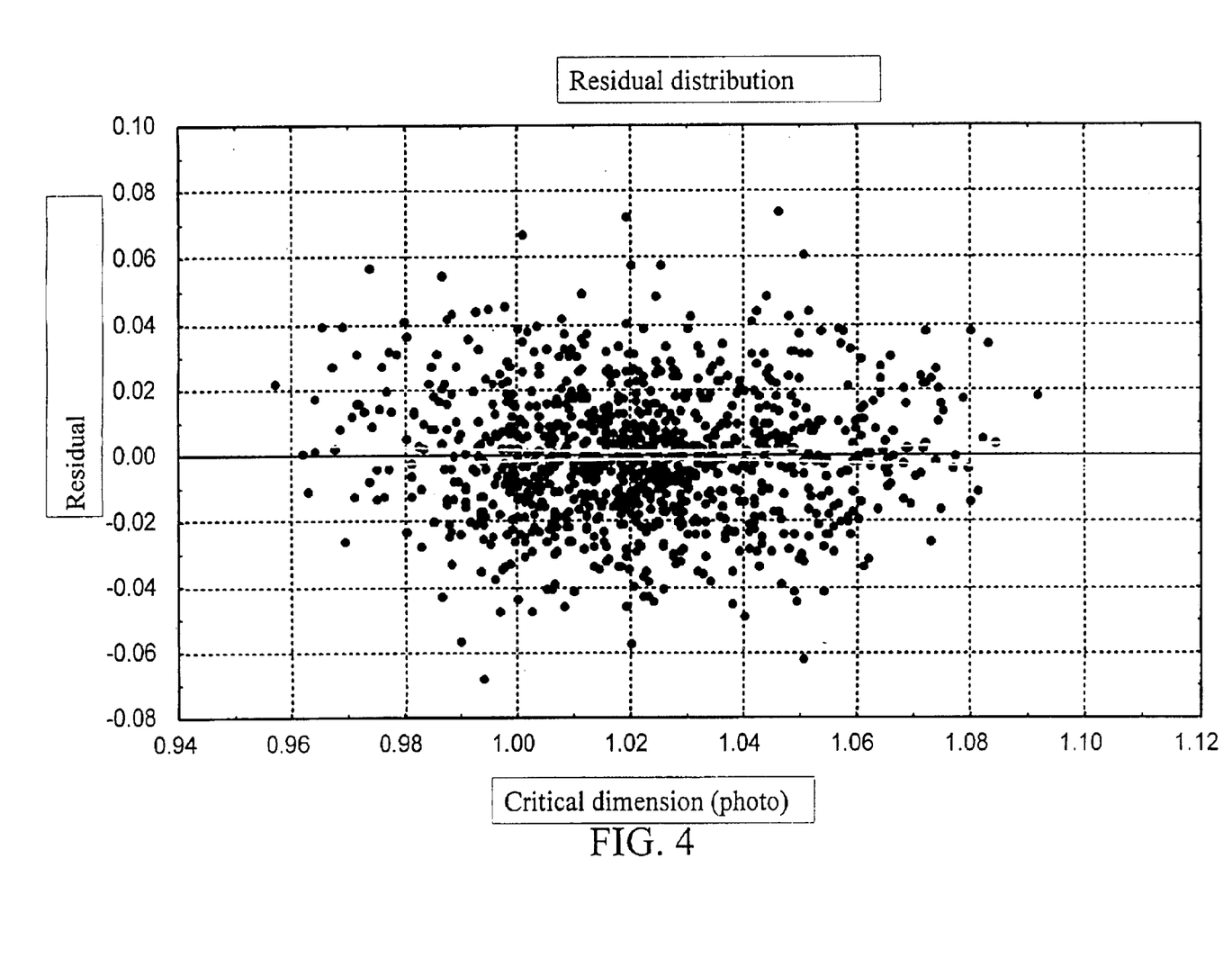
FIG. 4 shows the residual distribution of FIG. 3 according to the method of the present invention.

FIG. 4 shows the residual distribution of FIG. 3, wherein the vertical axis represents the residual $e_i$ and the horizontal axis represents the photolithography critical dimension $X_i$. The distribution of residual $e_i$ is independent of the photolithography critical dimension $X_i$ and is centered around $e_i=0$. Moreover, the distribution is mostly concentrated around $e_i=0$ and decreases as the square of $e_i$ increases. Therefore, the distribution of the error $\epsilon_i$ fits a normal distribution, as indicated by the regression analysis. The photolithography critical dimension $X_i$ and the etch critical dimension $Y_i$ satisfy the following relation, wherein $\epsilon_i$~Normal distribution $N(0,\sigma^2)$ and $Y_i$~$N(a+cX, \sigma^2)$.

$$Y_i = a + cX_i + \epsilon_i$$

Then, the total variance of $Y_i$, also named total sum of squares (SSTO), can be grouped into two items, which are error sum of squares (SSE) and regression sum of squares (SSR), as shown by the following equation.

$$\sum (Y_i - \overline{Y})^2 = \sum (Y_i - \hat{Y}_i)^2 + \sum (\hat{Y}_i - \overline{Y})^2,$$

wherein SSTO=SSE+SSR

The SSE and SSR are contributed from the variations of etch critical dimension Yi (post process) and photolithography critical dimension Xi (pre-process), respectively, and the corresponding mean of square regression (MSE) and mean of square error (MSR) are represented by the following equations, respectively.

$$MSE = \frac{\sum (Y_i - \hat{Y}_i)^2}{(n-2)} = \frac{\sum e_i^2}{(n-2)}, \text{ wherein } n \text{ is the sampling number.}$$

$$MSR = \frac{\sum (\hat{Y}_i - \overline{Y})^2}{1}$$

Thus, the MSE represents the variance of the distribution of the etch critical dimension $Y_i$, and the MSR represents the variance of the distribution of the photolithography critical dimension $X_i$. The UCL and LCL of the etch process are evaluated from the MSE as the following equations, respectively.

$$Y = \hat{a} + \hat{c}X + 3\sqrt{MSE} \text{ (UCL)}$$

$$Y = \hat{a} + \hat{c}X - 3\sqrt{MSE} \text{ (LCL)}$$

Figure 5:
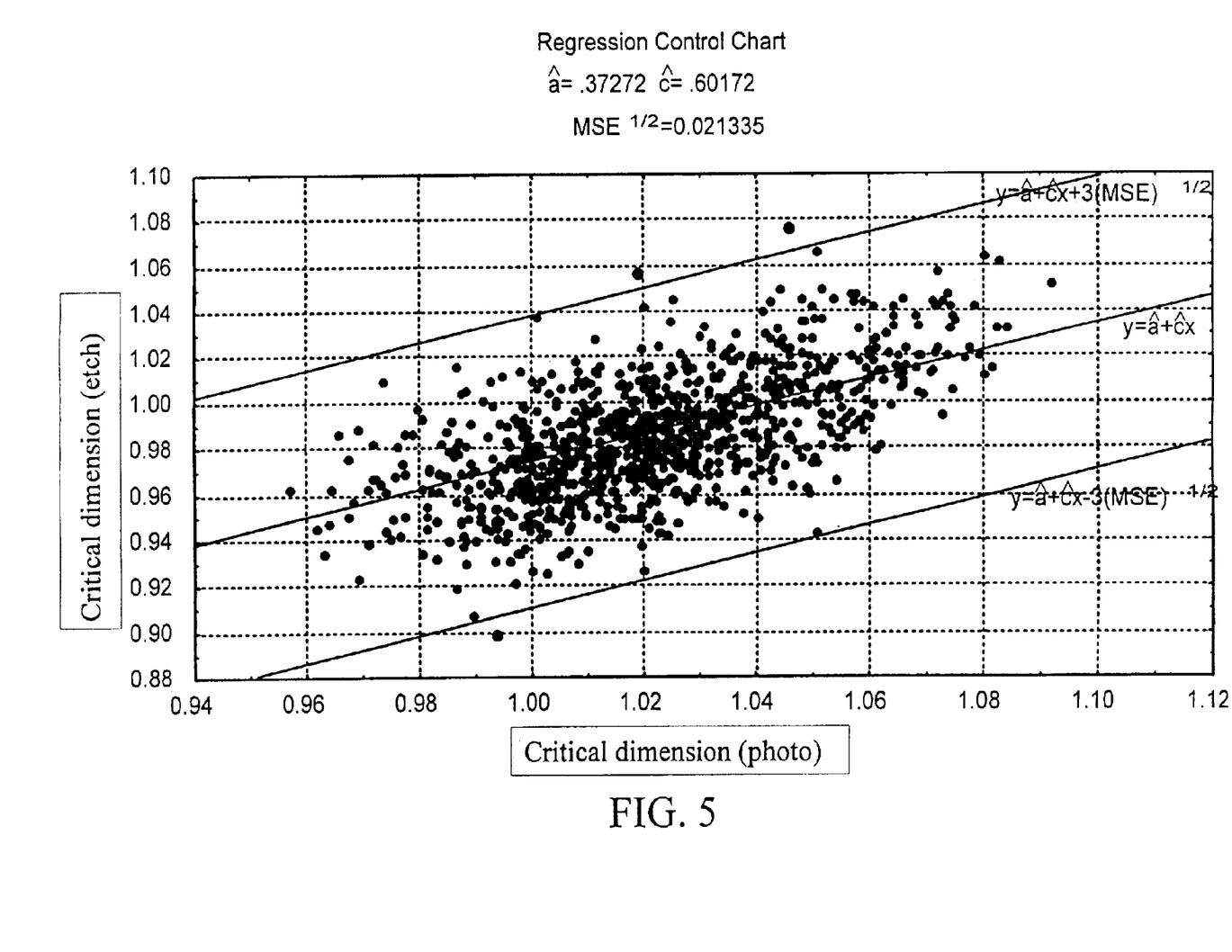
FIG. 5 shows the SPC method according to an embodiment of the present invention applied to the distribution of critical dimension measurements in FIG. 2.

Referring to FIG. 5, it shows the SPC method applied to the critical dimension distribution of FIG. 2, wherein the three lines, from the top to bottom, are respectively the UCL, mean value, and the LCL. In FIG. 5, only 3 measurements are located out of the control limits of ULC and LCL, and (1030–3) measurements are located within the control limits of ULC and LCL. The relation between the measurements and the control limits meets the right number of normal distribution requirement, which requires 99.73% measurements to be within the ULC and LCL. Therefore, the relation also indicates that the control limits of ULC and LCL are determined reasonably in that the data of FIG. 2 are collected under stable processes.

Figure 6:
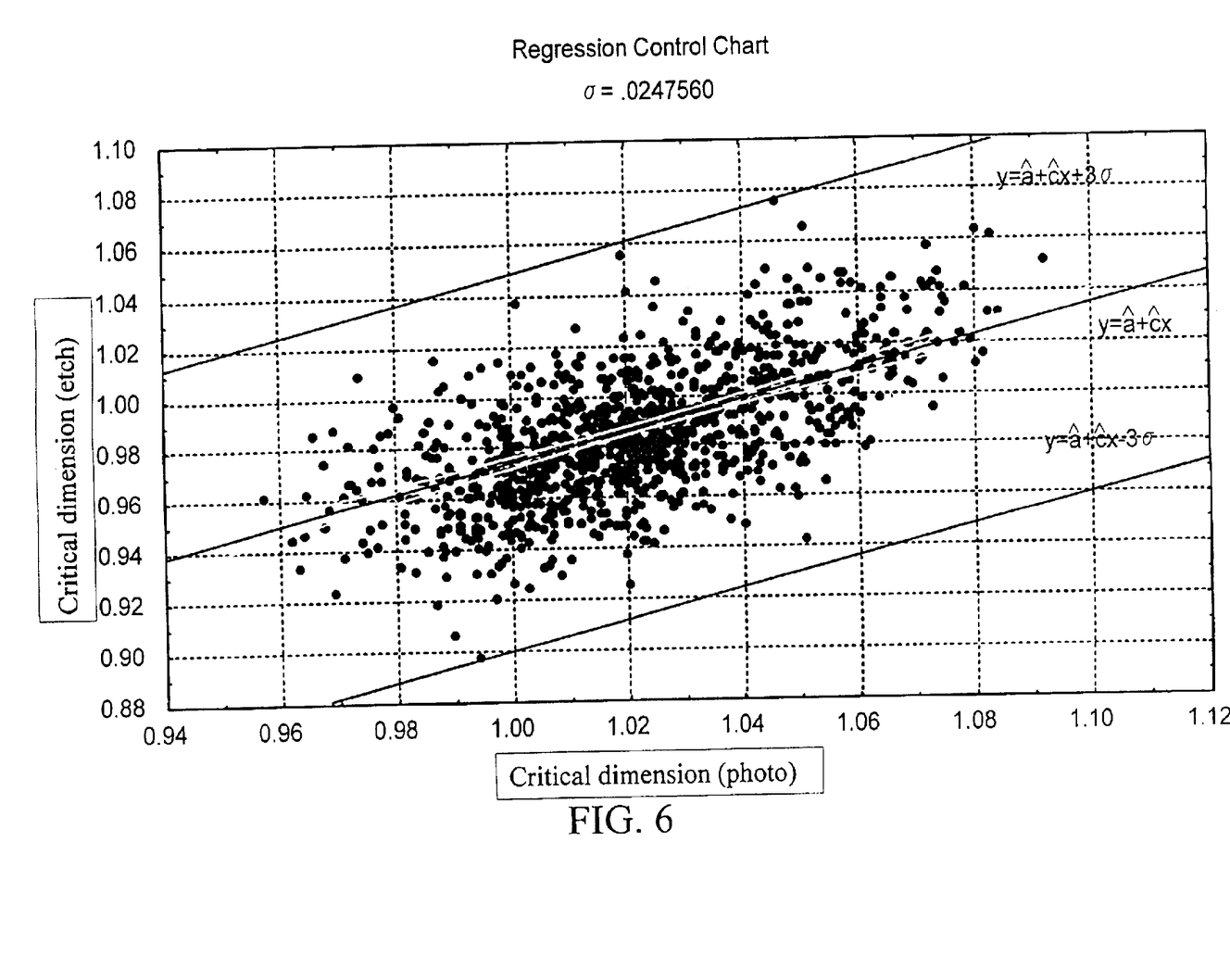
FIG. 6 shows the SPC method according to an embodiment of the traditional method applied to the distribution of critical dimension measurements in FIG. 2.

FIG. 6 shows that the ULC and LCL with $3(SSTO)^{1/2}$ are applied to the distribution of FIG. 2. Because the $3(SSTO)^{1/2}$ is larger than $3(MSE)^{1/2}$, the range between the ULC and LCL of FIG. 6 is broader than that of FIG. 5. In FIG. 6, all measurements are located within the UCL and LCL thereof. However, the measurements thereof are collected under stable processes, and they should obey the normal distribution that 99.73% measurements are located within the ULC and LCL. It appears that the ULC and LCL of FIG. 6 are too loose to detect the abnormal manufacturing.

Finally, the ULC and LCL, as shown in FIG. 5, can be applied to the mass production as a monitoring tool. Other than the ULC and LCL, the general SPC rules also can be applied in the present invention for further restriction. For instance, the continual increasing or decreasing of three data will trigger the monitoring system of SPC even if the data is within the control limits. Or if there are five continual measurements larger or smaller than the average, the SPC system will deliver a warning message. Whether the restriction is needed depends on the characteristics of the process or the requirements of the processing consistency.

Figure 7:
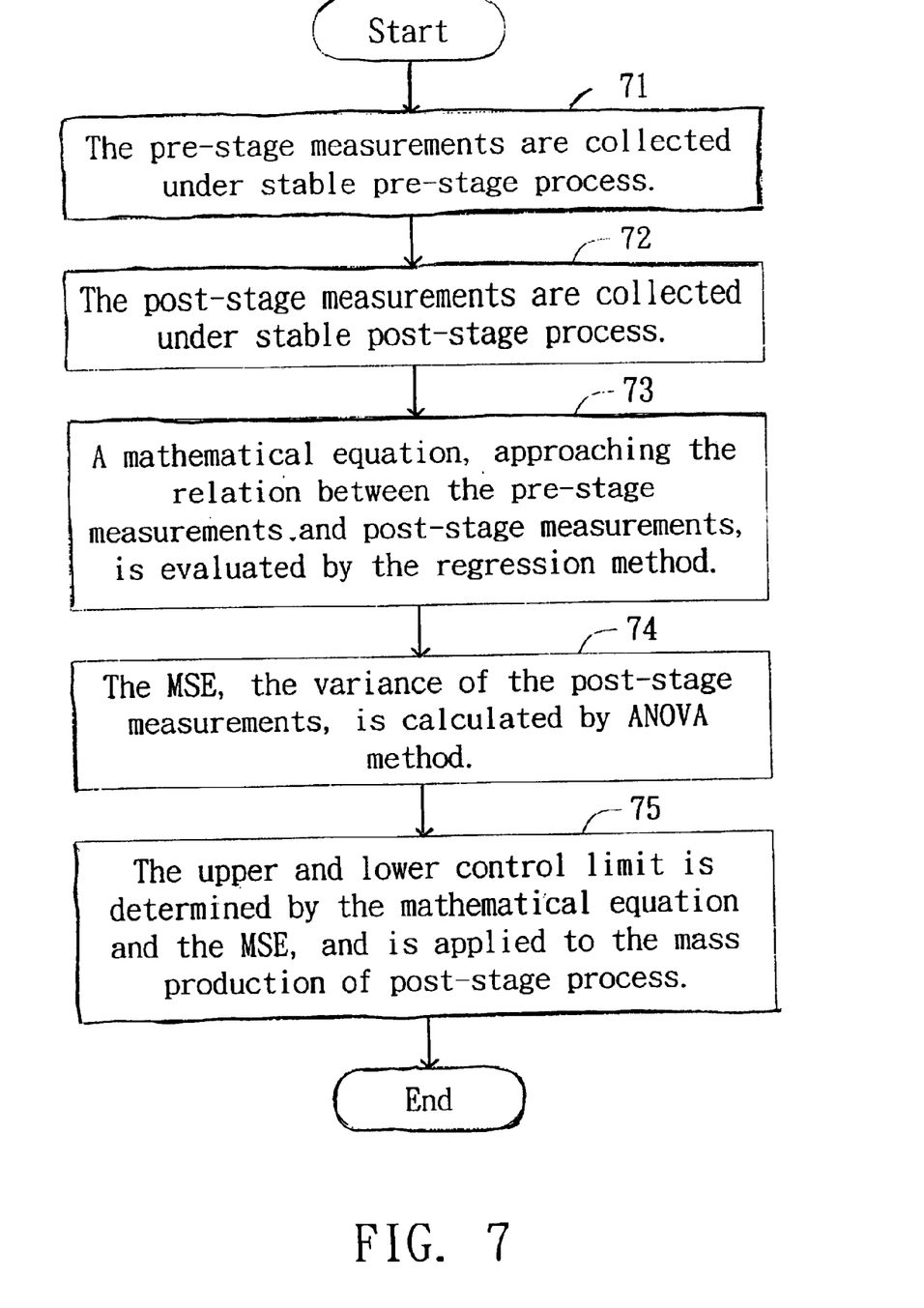
FIG. 7 shows the flow chart of the SPC method according to an embodiment of the present invention.

FIG. 7 shows the flow chart of the SPC method according to an embodiment of the present invention. First, the pre-stage measurements are collected under a stable pre-stage process in step 71. Then, the post-stage measurements are collected under a stable post-stage process in step 72. In step 73, a mathematical equation, approaching the relation between the measurements of the pre-stage process and the post-stage process, is evaluated by a regression method. In step 74, the MSE or the variance of the post-stage measurements is calculated by the ANOVA method. Finally, in step 75, the ULC and LCL are determined by the mathematical equations and the MSE, and are applied to the mass production of the post-stage process.

Figure 8:
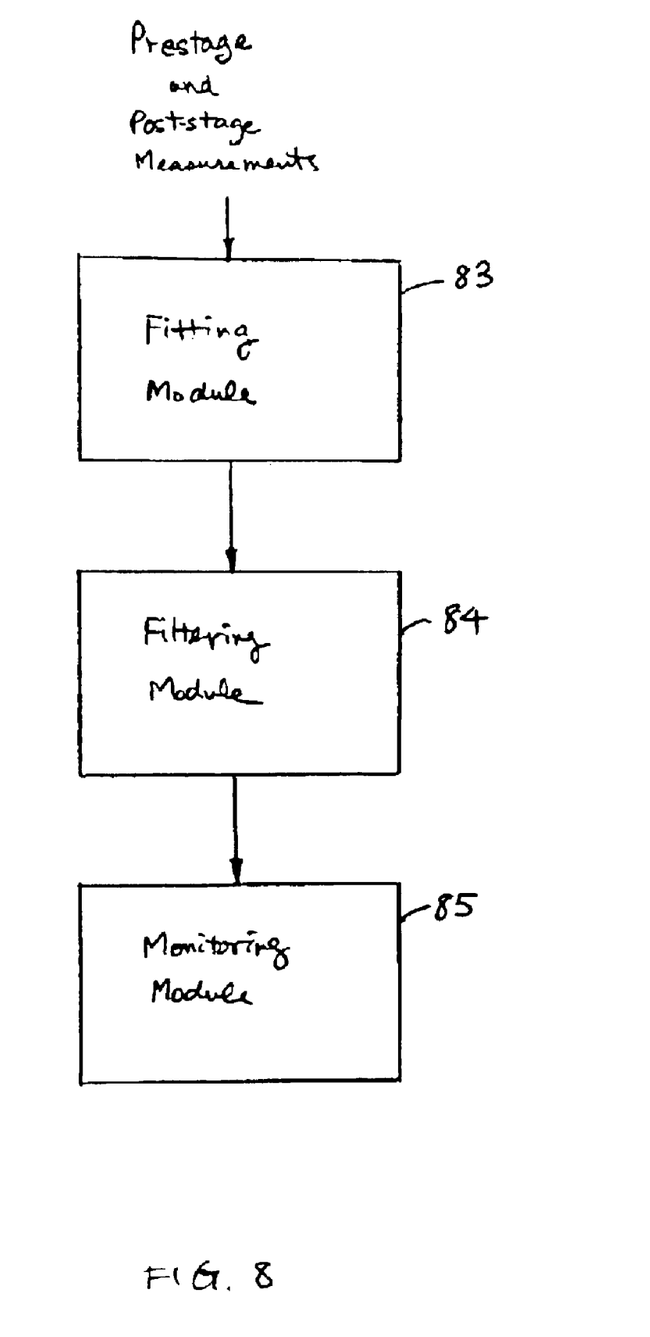
FIG. 8 is a simplified block diagram of a SPC system according to an embodiment of the present invention.

The SPC method of the present invention is implemented by an SPC system, wherein the step 73, step 74, and step 75 are respectively processed by a fitting module 83, a filtering module 84, and a monitoring module 85, as illustrated in the simplified block diagram of FIG. 8.

By taking the variance of the pre-stage process as a consideration, the SPC method disclosed in the present invention can deliver a warning message at the right time. For instance, if the process is unstable, the warning message is triggered and vice versa. After separating out the variance of the pre-stage process, the SPC system, by utilizing the variance contributed only from the post-stage process, will not provide a control limit too loose to detect the unstable process.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A statistical process control (SPC) method for a post-stage process which is related to a pre-stage process, said SPC method comprising:

collecting a plurality of pre-stage measurements during said pre-stage process;

collecting a plurality of post-stage measurements during said post-stage process, said plurality of post-stage measurements corresponding to said plurality of pre-stage measurements;

evaluating an equation for approaching a relation between said plurality of post-stage measurements and said plurality of pre-stage measurements;

calculating a post-stage variance based on said equation, said post-stage variance being independent of a fluctuation of said plurality of pre-stage measurements; and monitoring said post-stage process of mass production by an upper control limit and a lower control limit, wherein said upper control limit is equal to said equation plus half order of said post-stage variance and said lower control limit is equal to said equation minus half order of said post-stage variance.

2. The SPC method according to claim 1, wherein evaluating said equation comprises implementing a regression method to approach said relation between said plurality of post-stage measurements and said plurality of pre-stage measurements.

3. The SPC method according to claim 1, wherein said equation is a linear equation.

4. The SPC method according to claim 1, wherein a distribution of said plurality of post-stage measurements comprises a total post-stage variance larger than said calculated post-stage variance.

5. The SPC method according to claim 1, wherein monitoring said post-stage process of mass production further comprises applying a rule of over three data being continually increasing or decreasing as control limitations.

6. The SPC method according to claim 1, wherein monitoring said post-stage process of mass production further comprises applying a rule of over five continual measurements larger or smaller than said equations as control limitations.

7. The SPC method according to claim 1, wherein said post-stage process is an etching process and said pre-stage process is a photolithography process.

8. The SPC method according to claim 1, wherein said plurality of post-stage measurements are etch critical dimensions and said plurality of pre-stage measurements are photolithography critical dimensions.

9. The SPC method according to claim 1, wherein evaluating said equation, $\hat{Y}=\hat{a}+\hat{c}X$, comprises employing a relation $y=a+cx$ between said pre-stage measurements $X_i$ and said post-stage measurements $Y_i$, and determining constants a and c to satisfy a minimum result of $$\sum_{i=1}^{n}(Y_i-(a+cX_i))^2,$$

wherein i=1 to n and n is a sampling number; wherein determining the constants a and c comprises:
computing â which is an estimated value of the constant a and ĉ which is an estimated value the constant c, using $$\hat{c}=\frac{\sum(X_i-\overline{X})(Y_i-\overline{Y})}{\sum(X_i-\overline{X})^2}, \quad \hat{a}=\overline{Y}-\hat{c}\overline{X},$$

wherein $\overline{X}$ is an average of the pre-stage measurement $X_i$ and $\overline{Y}$ is an average of the post-stage measurements $Y_i$.

10. The SPC method according to claim 9 wherein calculating said post-stage variance comprises:
calculating $\hat{Y}_i=\hat{a}+\hat{c}X_i$, wherein $\hat{Y}_i$ is an estimation of the post-stage measurements $Y_i$ based on the pre-stage measurements $X_i$;
computing a plurality of residual $e_i=Y_i-\hat{Y}_i$, for each ith post-stage measurement $Y_i$ and each ith estimation of the post-stage measurement $\hat{Y}_i$; and
calculating a mean of square regression MSE as the post-stage variance using $$MSE=\frac{\sum(Y_i-\hat{Y}_i)^2}{(n-2)}=\frac{\sum e_i^2}{(n-2)}.$$

11. The SPC method according to claim 10, wherein monitoring said post-stage process of mass production comprises calculating the upper control limit $$Y=\hat{a}+\hat{c}X+3\sqrt{MSE}.$$

12. The SPC method according to claim 10, wherein monitoring said post-stage process of mass production comprises calculating the lower control limit $$Y=\hat{a}+\hat{c}X-3\sqrt{MSE}.$$

13. A statistical process control (SPC) system for a post-stage process which is related to a pre-stage process, wherein a plurality of pre-stage measurements and a plurality of post-stage measurements are collected respectively under a stable pre-stage process and a post-stage process and are corresponding to each other, said SPC system comprising:
a fitting module configured to evaluate an equation to approach the relation formed by said plurality of post-stage measurements and said plurality of pre-stage measurements;
a filtering module configured to calculate a post-stage variance based on said equation, said post-stage variance being independent of a fluctuation of said plurality of pre-stage measurements; and
a monitoring module configured to monitor said post-stage process on mass production by an upper control limit and a lower control limit, wherein said upper control limit is equal to said equation plus half order of said post-stage variance and said lower control limit is equal to said equation minus half order of said post-stage variance.

14. The SPC system according to claim 13, wherein said evaluation module implements a regression method to approach said equation.

15. The SPC system according to claim 13, wherein said equation is a linear equation.

16. The SPC system according to claim 13, wherein a distribution of said plurality of post-stage measurements comprises a total post-stage variance larger than said post-stage variance.

17. The SPC system according to claim 13, wherein said monitoring module monitors said post-stage process of mass production by a rule of over three data being continually increasing or decreasing as control limitations.

18. The SPC system according to claim 13, wherein said monitoring module monitors said post-stage process of mass production by a rule of over five continual measurements larger or smaller than said equations as control limitations.

19. The SPC system according to claim 13, wherein said post-stage process is an etching process and said pre-stage process is photolithography process.

20. The SPC system according to claim 13, wherein said plurality of post-stage measurements are etch critical dimensions and said plurality of pre-stage measurements are photolithography critical dimensions.

* * * * *